May 16, 1967
N. REINHARDT ET AL
3,320,456
CORROSION INHIBITING FITTING FOR FLUID-COOLED
ELECTRIC-DISCHARGE LAMPS
Filed Aug. 25, 1965
2 Sheets-Sheet 1
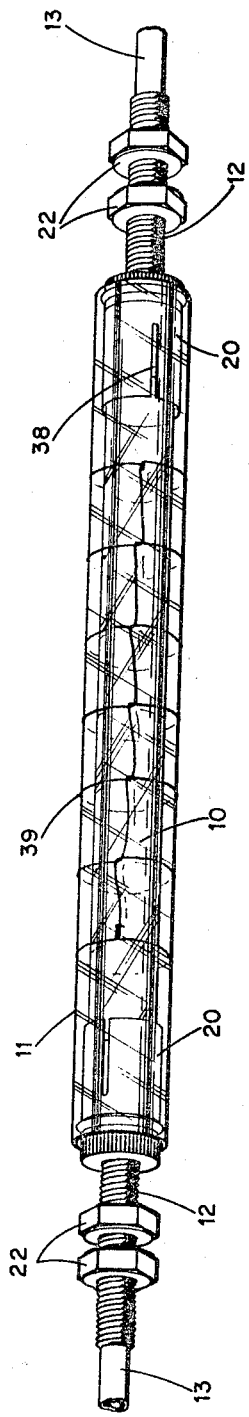
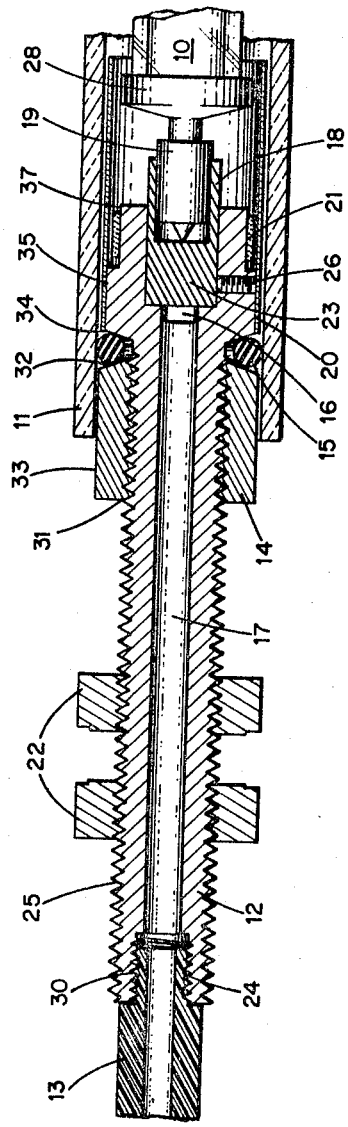
NICHOLAS REINHARDT
ABBOTT S. GALAHER
VINCENT J. GEORGE
INVENTORS
BY Cadwallader, Kelly & Dacey
ATTORNEYS May 16, 1967 N. REINHARDT ET AL 3,320,456
CORROSION INHIBITING FITTING FOR FLUID-COOLED
ELECTRIC-DISCHARGE LAMPS
Filed Aug. 25, 1965 2 Sheets-Sheet 2

NICHOLAS REINHARDT
ABBOTT S. GALAHER
VINCENT J. GEORGE
*INVENTORS*

BY *Cadwallader, Kelly & Dacey*

ATTORNEYS

United States Patent Office

3,320,456
Patented May 16, 1967

3,320,456
CORROSION INHIBITING FITTING FOR FLUID-
COOLED ELECTRIC-DISCHARGE LAMPS
Nicholas Reinhardt, Lexington, Abbott S. Galaher, North
Andover, and Vincent J. George, Winchester, Mass.,
assignors to Edgerton, Germeshausen & Grier, Inc.,
Bedford, Mass., a corporation of Massachusetts
Filed Aug. 25, 1965, Ser. No. 482,508
16 Claims. (Cl. 313—23)

This invention relates to fittings and more particularly to fittings which provide fluid and electrical connections to electric-discharge devices for cooling by a circulating fluid. The fitting of this invention has its greatest utility with a corrosive cooling fluid such as water, although it is useful with any fluid coolant.

Water has long been used to cool electric-discharge devices by extracting high proportions of the great heat produced therein to permit operation at higher repetition rates and at increased power levels. Water-cooling means are useful with a variety of electric discharge devices such as hydrogen thyratrons, high power diodes, vacuum and gas-filled spark gaps and electronic flashtubes. The invention disclosed herein is directed primarily to electronic flashtubes of the triggered or untriggered type but it must be recognized that the invention has greater scope and may be used with other electric discharge devices, such as those mentioned above.

To simplify the discussion of this invention, with no intention of limiting its scope, we shall concentrate upon fittings for water-cooled electric flashtubes, but the worker skilled in this art will readily appreciate the value of the invention with other high power devices and other coolants.

Electric flashtubes present greater problems in the construction of the cooling chamber and fittings because the chamber must be at least translucent and preferably transparent. This requirement necessitates the use of glass or a similar fragile substance for the chamber. The fitting must be sensitive to the fragile construction of the chamber so that it provides positive sealing thereto without injuring or damaging it.

It is important in the design and construction of flashtubes to minimize bulkiness and complexity and to maximize the proportion of the tube length to emit light. This is so because there are usually critical space limitations and exacting geometrical requirements governing the mounting and locating of the flashtube. For this reason it is preferable to employ a fitting which serves the double purpose of supplying the electrical energy and providing a heat exchange between the active elements in the tube and the coolant.

The most economical and most readily available form of water is ordinary tap water. Because it is economical it may be used without special cooling and recirculating equipment. Tap water has not been used extensively because these flashtubes and other discharge devices operate at such voltages that significant amounts of power can flow between bare metal fittings at different voltages when weakly conducting electrolytes, such as tap water, are used as the coolant. The current flow is sufficient to cause extensive electrolytic corrosive damage to exposed metal parts made of any of the ordinary economical metals. Furthermore, even in the absence of an externally applied voltage, exposed metal parts in tap water are subject to the well-known galvanic corrosion suffered by dissimilar metals.

The prior art has emphasized the use of distilled or demineralized water to minimize electrolytic corrosion of exposed metal parts. It was necessary to maintain the purity of this water at a high level and to introduce cooling coils or heat exchangers as well as pumping means as an alternative to providing an excessive supply of such expensive water. Tap water was seldom used because electrolytic and galvanic corrosion would quickly attack the exposed metal parts of both the flashtube and the fitting to render the system inoperative within a short time. To prevent such corrosion, coatings were applied to these metal parts. Inert, noble or non-conductive (organic) materials were tested. With all of these coatings there was danger of catastrophic failure caused by minute holes or breaks in the coating. Corrosive action would be concentrated at these points and cause holes to form. Organic coatings showed a failure to adhere after a short time due to water absorption or to damage from ultraviolet light radiated by flashtubes. Another important disadvantage in the use of organic coatings were poor heat-transfer characteristics which greatly reduced the effectiveness, and thus the advantages, of water cooling.

It is an object of this invention to provide a new and novel fitting for electric and water connections to electric discharge devices disposed in cooling chambers.

Another object is to provide a fitting for the prompt and efficient transfer of heat from the active elements of the flashtube to the cooling water.

A further object is to provide a fitting which reduces the damaging effects of electrolytic corrosion on the essential metallic parts.

Still another object is to provide a fitting which reduces the effects of galvanic corrosion on essential parts.

A further object of this invention is to provide an auxiliary element which acts as a sacrificial element to absorb corrosion and thereby protect the essential parts.

An important object of this invention is to provide an inexpensive, workable fitting which holds the flashtube in position and permits simple and easy assembly and disassembly of the flashtube and chamber.

Still a further object of this invention is to provide a fitting which may use tap water without auxiliary insulative coating on the conductive members exposed therein.

In summary, this invention is a fitting for a water-cooled electric flashtube disposed within a cooling chamber. The fitting provides both electrical and hydraulic connections to the flashtube and chamber respectively, a heat transfer route for the high powers dissipated therein and provides sacrificial elements to absorb galvanic and electrolytic corrosion.

Prior art uses of corrosion inhibiting sacrifice-pieces and electrical current "thieves" have been limited to environments where the voltages causing corrosion are on the order of millivolts or, in the case of electroplating practices, a few volts. With the present invention, however, we have found that sacrifice-pieces and current "thieves" may be used in the high power environment of electric flashtubes and the like, characterized by thousands of volts, high instantaneous temperatures, pressures and shock waves associated with the intense flashing and rapid firing of the tube where energy at megawatt rates is quickly discharged during a typical flash.

Other and further objects will be hereinafter pointed out in the following specifications and more particularly by referring to the appended claims.

This invention will be better understood by referring to the attached drawings in which FIGURE 1 is a perspective view of the fitting of this invention shown attached at each end of a water-cooled electric flashtube system;

FIGURE 2 is a sectional view of one end of the system of FIGURE 1;

Figure 3:
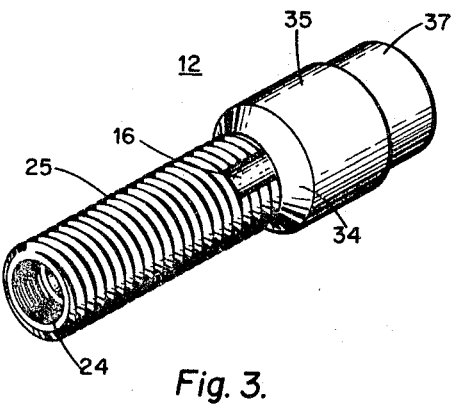
FIGURE 3 is a perspective view, partly in section, of the stud 12 of FIGURE 2.

Referring to the drawings in which similar components are given similar numbers, the fitting of this invention is shown at each end of open-ended chamber 11, which in the case of a flashtube, is a light-transmitting housing, such as, for example, quartz. Any of the heat resistant glasses may be used but quartz is preferred because, at high powers, glass will tend to spall and its surface may discolor, thus changing its light-transmitting characteristics. A flashtube 10 is shown disposed within the chamber 11 and may be any of a large variety of flashtubes. This particular fitting may be employed with flashtubes having any glass-to-metal seals but it is especially useful with flashtubes which employ solder seals, such as those taught in U.S. Letters Patent No. 2,756,361, issued on July 24, 1956 to K. J. Germeshausen and assigned to the assignee thereof. It is preferred that the flashtube be a linear tube for simple installation within chamber 11. This, of course, is not essential for the configuration of chamber 11 and need not be cylindrical but may be varied to match the geometric shape of the flashtube.

A stud 12 is shown passing through the open end of chamber 11. This stud is used to hold the flashtube in position and to provide electric and coolant connections to the flashtube. Threads 24 are disposed on the inner surface of stud 12 at its left-hand end to provide connection to the source of tap water. The outer surface of the substantially cylindrical stud 12 has threads 25 which are useful for providing electrical connection between the pair of nuts 22. A retaining member 14 is threadably attached to stud 12 and assists in providing a fluid-tight connection between the fitting and the chamber 11. Member 14 has a sloping end surface 32 which presses against the sealing means 15. Stud 12 has an inclined surface 34 disposed on the opposite side of seal 15 from surface 32, so that they form a V with its vertex pointing toward the interior of the fitting. An O-ring 15 is disposed between surfaces 32 and 34 and in contact with the inside surface of chamber 11. By rotating retaining member 14 about stud 12, member 14 is advanced toward O-ring 15 and the surfaces 32 and 34 exert a force against O-ring 15 pushing it outwardly against chamber 11 thus providing a water tight seal for the fitting. We have found it to be advantageous to knurl the surface 33 of member 14 to discourage the use of wrenches. It may be tightened by hand to provide adequate sealing without excessive force which could damage the seal.

Stud 12 is a metallic conductor to provide electrical contact to flashtube terminal 19. We have used tellurium copper for these elements although brass or other members may be used. The conductivity of tellurium copper is superior to that of brass while providing substantially the same resistance to corrosion.

An insulative pipe member 13 is threadably connected to the left-hand end of stud 12. A nylon pipe was selected for this purpose because it was electrically insulative and had the quality of absorbing water to a slight degree over long periods of time and the slight swelling improves its mechanical coupling to stud 12. A sealing compound may be used in the threads 30 and 24 of pipe 13 and stud 12 respectively to improve the connection therebetween.

A connector 18 is disposed at the right-hand end of stud 12 to provide electric coupling to terminal 19 of flashtube 10. The size and configuration of terminal 18 may be varied in accordance with the type of flashtube used and its terminal 19. A set screw 23 passing through opening 26 in stud 12 maintains connector 18 in position. For ease in assembly and disassembly, flashtube 10 is slip-fitted in terminal 18.

There is a shoulder 35 on stud 12 on which shield 20 may be push-fitted. Shield 20 is a current "thief." Electroplaters have long used this trick at low power levels to prevent the deposit of plating in certain areas. Here the action is reversed. De-plating of the end cap 28 and the terminal 18 is prevented. This shield or thief 20 is connected to the high-voltage or anode electrode of the flashtube 10 only and is unnecessary at the cathode end. Because of the high voltage, usually a few kilovolts, impressed across the flash-tube electrodes, a current of several tens of milliamps is caused to flow from the anode electrode through the water toward the cathode. This current would cause a rapid dissolution of the unprotected metal parts of the cap 28 and terminal 18 in the absence of shield 20. With the use of such a shield, the deplating is transferred from these functionally important elements to the shield itself. The shield 20 extends as a cylinder about the terminal 18 and the end cap 28 so that it is the closest conductor connected to the anode in the direction of the cathode of the flashtube 10. There are slits 38 in shield 20 to permit any bubbles in the water to escape and pass through the water system.

Shield 20 must be constructed of a conductive metal and preferably one which is resistant to corrosion. Platinum or one of the other noble metals would be ideal, but stainless steel has been found to be quite satisfactory.

A second shoulder 37 on stud 12 is provided for ring 21 which also serves as a sacrificial element to absorb the galvanic corrosion which otherwise would have attacked the functionally important metals. Ring 21 is attached to shoulder 37 of stud 12 by push-fitting or any other suitable means. It is important that ring 21 be in contact with the flashtube electrode 19. In an impure water environment, the ring 21 suffers anodic corrosion while the essential parts enjoy cathodic protection. Ring 21 is slip-fitted on stud 12 and held in place by friction. This permits easy removal and replacement when necessary. In normal use, replacement need only be made at intervals of several months. Ring 21 must be made of a metal more anodic than the other materials employed in the flashtube and fitting and exposed to the water. By thus selecting a more corrosive element for ring 21, protection of the functionally important metals is assured. Since the other exposed metals in the flashtube and the fitting are lead, copper and iron, then an aluminum ring 21 adequately serves this purpose.

Figure 4:
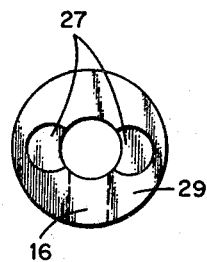
FIGURE 4 is an end view of the stud of FIGURE 3.

When the fitting is mounted in position at the open end of chamber 11 and retaining member 14 is advanced to cause O-ring 15 to make a fluid-tight seal with the inside of chamber 11 and surface 34 of stud 12, it is ready to provide water and electrical energy to the flashtube 10. Water flows through nylon pipe 13 to the passage 17, centrally disposed in stud 12 and passes therealong to exit port 16 or to side lobes 27 (see FIGURE 4), which permits the water to flow through the terminal connector 18 and about terminal 19 of flashtube 10. It is important to cool terminal 19 because a large proportion of the heat generated within the flashtube 10 flows through terminal 19. The water also passes about the end cap 28 cooling it and the means by which it is sealed to the envelope of flashtube 10. The water passes through chamber 11 and out the opposite end through a similar fitting. If tap water is used, the fitting at the right-hand end, as shown in FIGURE 1, may be connected to a drain. If a more expensive liquid or gas is used in the cooling process or if distilled or demineralized water is employed, then a recirculation system with cooling means incorporated therein must be provided to form a complete system. It is obvious that tap water is a simpler and more economical coolant.

Spade-type electrical connectors, or the like, may be employed to provide electrical connection to the outer surface of stud 12. The connector is disposed between the two nuts 22 which are tightened together to hold the connector in place. The electrical energy connected to stud 12 passes through terminal connector 18 to terminal 19 of flashtube 10. A similar connection in the fitting at the opposite end of the tube provides a means for completing the circuit.

It is preferred to use a two-electrode flashtube within chamber 11. If a three-electrode or triggered flashtube is required, the trigger electrode may be wound about the outer surface of chamber 11 in the region of the spacing between the flashtube's principal electrodes. Such a trigger wire is shown as 39 in FIGURE 1.

As an example, the flashtube 10 may be a type FX67A, manufactured by Edgerton, Germeshausen & Grier, Inc., the assignee hereof, and the chamber 11 is a quartz tube having an inside diameter of approximately ¾ inch. Nylon pipe 13 may be approximately 2 inches long with the last ½ inch having external threads 30 to match the internal threads 24 on stud 12. The pipe 13 has an outside diameter of ¼ inch. Stud 12 is preferably constructed of tellurium copper with an optional nickel plate. The central passage 17 therein is approximately ¼ inch in diameter, and the stud length is about 2 inches. Surfaces 32 and 34 are cut to form a 40° angle, thus, pushing O-ring 15 outwardly when the surfaces are brought together.

It will be readily observed that the fitting can be quickly removed from the chamber 11. By rotating retaining member 14 and releasing the pressure on O-ring 15, the seal is broken and the fitting is removable. Only one set screw is employed in the entire fitting and this set screw 23 holds terminal connector 18 firmly in place at the end of stud 12. Set screw 23 provides a means for changing terminal connectors 8 in order to match the configuration of different flashtube terminals. The flashtube terminal 19 is held by friction in terminal connector 18. Ring 21 and shield 20 are slip-fitted onto shoulders 35 and 37 respectively. This ease in removing the fitting permits replacement of the flashtube whenever it is necessary, without undue delay.

The interior portions of the fitting and the flash system may be cleaned by removal from their mounted positions or they may be cleaned by circulating a weak acid solution through the water system. All the parts of the fitting and the flashtube itself are resistant to such an acid cleaner.

Figure 5:
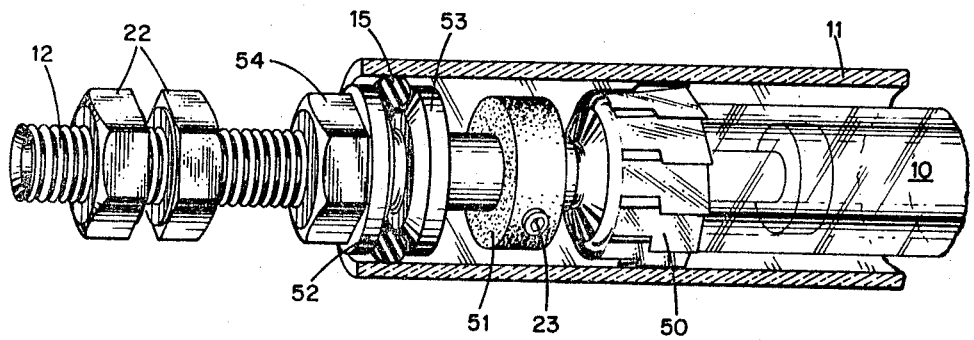
FIGURE 5 is a perspective view, partly in section, of a modification of the invention.

A modification of the present invention is shown in FIGURE 5. The fitting consists of a stud 12 having external threads 25 to which insulated tubing may be connected. Standard polyethylene tubing using a brass or similar connector (not shown) may be used to supply water through stud 12, by flashtube terminal 19 to the interior of chamber 11. A pair of nuts 22 provides means for electrical connection. Flashtube 10 is held in position within the chamber 11 by terminal connector 51 which employs set screw 23 to maintain the flashtube terminal in position. The sealing means consists of an O-ring 15 disposed between the beveled edges 32 and 34 of washers 52 and 53 which, in response to pressure exerted by the rotation of nut 54, engages the inner wall of the transparent chamber 11, thus, providing a water-tight seal. An end cap spring 50, similar to that shown in applicant Reinhardt's copending application Ser. No. 425,695, filed Jan. 15, 1965, and entitled Protective Shield is mounted over the flashtube end cap and extends along the glass of flashtube 10 toward the cathode end thereof. This spring is preferably of stainless steel and serves the purpose of a current "thief" as previously described. Only one current "thief" 51 is required and that is located at the high voltage or anode terminal of the flashtube.

Galvanic corrosion is inhibited by the sacrificial element 51 which is made of a metallic element more anodic than the other elements exposed within the chamber 11. As previously pointed out, it is important that the sacrificial element 51 be in electrical contact with the high voltage circuit flowing through flashtube 10. A similar sacrificial element 51 is employed at the anode end of the flashtube 10.

In each of the modifications shown, it will be noted that the fittings fulfill each of the following functions:

(1) means for holding the flashtube in position;
(2) means for providing water connection to the flashtube;
(3) means for providing electrical connection to the flashtube;
(4) means for directing the water flow by the flashtube terminal and end cap to maximize cooling;
(5) means for providing a water-tight seal;
(6) means for inhibiting electrolytic corrosion; and
(7) means for inhibiting galvanic corrosion.

It is, of course, ot necessary that each fitting perform all the listed functions but rather to demonstrate the variety of functions of which the fitting is capable.

Many other modifications of these fittings will occur to those skilled in this art. These include off-center water intake and outlet, interchange and relocation of parts, and many more, but all of these variations are deemed to fall within the spirit and scope of this invention.

We claim:
1. A fitting for a fluid-cooled electric discharge device disposed in a chamber, comprising:
 an electrically conductive stud having an internal passage for said fluid;
 means for sealing the stud to said chamber;
 first means for electrically connecting the stud to said device;
 second means for electrically connecting the stud to a source of potential; and
 an anodic metallic member disposed in electrical contact with said stud.
2. A fitting as claimed in claim 1 in which said member is more anodic than any of the other metals of the fitting or device exposed to the fluid.
3. A fitting as claimed in claim 2 in which said member is a ring disposed about said stud.
4. A fitting as claimed in claim 2 in which said member is made of aluminum.
5. A fitting as claimed in claim 1 in which said sealing means is an O-ring seated against a movable surface which, when moved toward the O-ring exerts a force against the O-ring pressing it against a wall of the chamber.
6. A fitting as claimed in claim 5 and further comprising a retaining member threadably attached to said stud and having an inclined surface exerting said force against the O-ring.
7. A fitting as claimed in claim 1 in which said first electrical means is an electrically conductive connector disposed on said stud for supporting one electrode of said device.
8. A fitting for a fluid-cooled electric discharge device disposed in a chamber, comprising:
 an electrically conductive stud having an internal passage for said fluid;
 means for sealing the stud to said chamber;
 first means for electrically connecting the stud to the high-voltage terminal of said device;
 second means for electrically connecting the stud to a source of high-voltage potential; and
 a conductive metallic member disposed in electrical contact with the high-voltage electrode of said device and extending therefrom in the direction of the low-voltage electrode.
9. A fitting as claimed in claim 8 in which said conductive member is a hollow cylinder disposed about said high-voltage electrode.
10. A fitting as claimed in claim 9 in which said conductive member is made of stainless steel.
11. A fitting for a fluid-cooled electric discharge device disposed in a chamber, comprising:
 an electrically conductive stud having an internal passage for said fluid;
 means for sealing the stud to said chamber;
 first means for electrically connecting the stud to the high-voltage terminal of said device;

second means for electrically connecting the stud to a source of high-voltage potential;
an anodic metallic member disposed in electrical contact with the exposed metal parts; and
a conductive metallic shield disposed in electrical contact with high-voltage electrode and extending therefrom in the direction of the low-voltage electrode.

12. A fitting for a fluid-cooled electric discharge device disposed in a chamber, comprising:
an electrically conductive stud having an internal passage for said fluid;
means for sealing the stud to said chamber;
an electrical connector disposed at one end of the stud for attachment to the high-voltage electrode of said device;
means for connecting said stud to a source of high-voltage potential;
an anodic metallic member disposed in electrical contact with said stud; and
a conductive metallic member disposed in electrical contact with the high-voltage electrode of said device and extending therefrom in the direction of the low-voltage electrode.

13. A fitting as claimed in claim 12 in which said connector contains means for passing the fluid in the region of the high-voltage electrode.

14. A fitting for a water-cooled electric flashtube disposed in an open-ended translucent chamber, comprising:
an electrically conductive stud disposed in said chamber's open end having means for connection to a source of water, and an internal passage through which the water passes to the chamber;
an O-ring disposed in contact with the inside surface of said chamber for sealing the water therein;
a retaining member threadably connected to said stud for exerting a force upon said O-ring;
an electrical connector disposed at the end of the stud in the chamber for attachment to an electrode of said flashtube;
means for connecting said stud to a source of electrical potential; and
an anodic metallic ring disposed in said water in electrical contact with said electrode.

15. A fitting for a water-cooled electric flashtube disposed in an open-ended translucent chamber, comprising:
an electrically conductive stud disposed in said chamber's open end having means for connection to a source of water, and an internal passage through which the water passes to the chamber;
an O-ring disposed in contact with the inside surface of said chamber for sealing the water therein;
a retaining member threadably connected to said stud for exerting a force upon said O-ring;
an electrical connector disposed at the end of the stud in the chamber for attachment to the high-voltage electrode of said flashtube;
means for connecting said stud to a source of high-voltage potential;
an anodic metallic ring disposed in said water in electrical contact with the high-voltage electrode;
a conductive metallic shield disposed in the water in electrical contact with the high-voltage electrode and extending in the direction of the low-voltage electrode.

16. A water-cooled flashtube system comprising:
a hollow translucent chamber;
an electric flashtube disposed in said chamber and having an electrode extending from each end thereof into said chamber;
a fitting disposed at each end of said chamber comprising:
an electrically conductive stud having an internal passage for said fluid;
means for sealing the stud to said chamber;
an electrical connector disposed at one end of the stud for attachment to an electrode of said device;
means for connecting said stud to a source of potential; and
an anodic metallic member disposed in electrical contact with said stud; and
a conductive metallic member disposed in electrical contact with the high-voltage electrode of said device and extending therefrom in the direction of the low-voltage electrode.

References Cited by the Examiner
UNITED STATES PATENTS

| 2,295,031 | 9/1942 | Davis | 313—23 X |
| 2,467,687 | 4/1949 | Noel | 313—22 X |
| 2,682,006 | 6/1954 | Ferrari | 313—23 X |

JAMES W. LAWRENCE, *Primary Examiner.*

C. R. CAMPBELL, *Assistant Examiner.*